May 20, 1941.  D. W. WATSON  2,242,602
DOUBLE DUTY FISHING TOOL
Filed Sept. 29, 1939
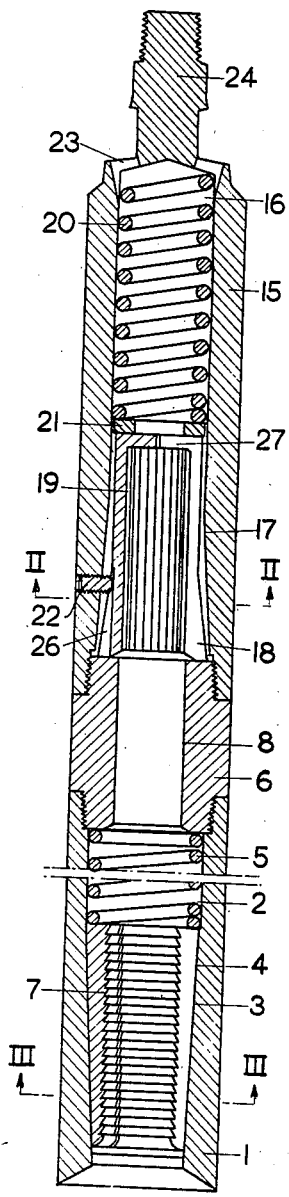
Fig. I
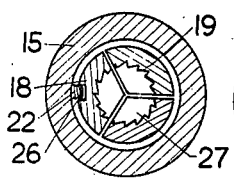
Fig. II
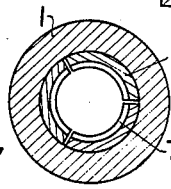
Fig. III
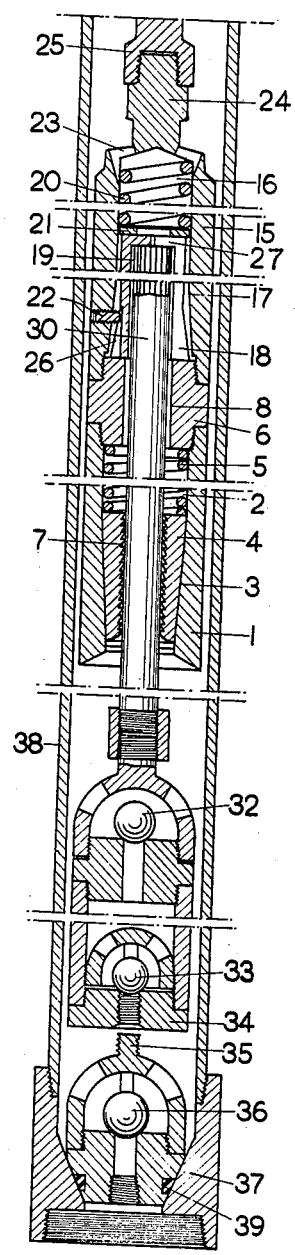
Fig. IV
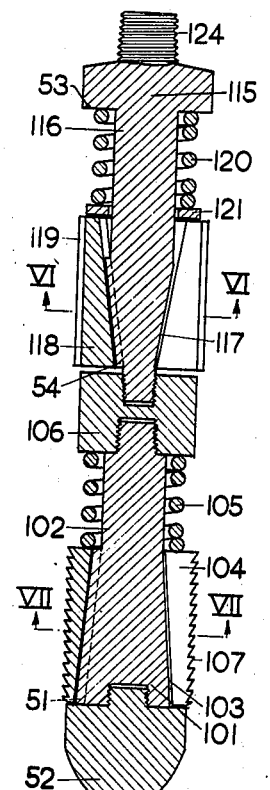
Fig. V
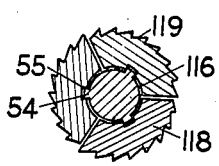
Fig. VI
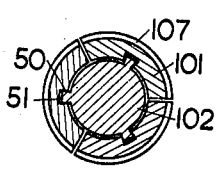
Fig. VII
Inventor: Douglas William Watson
By his Attorney:

Patented May 20, 1941

2,242,602

UNITED STATES PATENT OFFICE 2,242,602

DOUBLE DUTY FISHING TOOL

Douglas William Watson, Iraan, Tex., assignor to Shell Development Company, San Francisco, Calif., a corporation of Delaware Application September 29, 1939, Serial No. 297,091

3 Claims. (Cl. 294—102)

The present invention relates to fishing tools for retrieving "lost" or broken objects and pertains more particularly to devices which are actuated to grip the "fish" by longitudinal movement.

There are two general types of oil well pumps having a reciprocating plunger. In the insert or rod type, the pump barrel, plunger, traveling valves, and standing valves all form a complete unit which may be lowered into the well on a rod string. However, in liner or tubing type pumps, the barrel and standing valves are lowered into the well on the tubing and the plunger and traveling valves are introduced into the well on the rod string.

Often with these reciprocating plunger pumps, the sucker rod, which actuates the plunger, becomes parted or broken. After such rod breakage, the rod string above the fracture is first withdrawn from the well and then with pumps of the insert type the lower portion of the broken rod string, the plunger, traveling valves, barrel, and standing valves can be retrieved as a unit with a standard fishing tool.

However, in liner-type pumps, since the working barrel or liner with standing valves resting in a tapered seat at the lower end thereof is lowered into the well on the tubing, and the plunger with the traveling valves is lowered on the sucker rods, the standing valves cannot be raised in one operation together with the plunger and traveling valves for inspection by known fishing tools after rod breakage occurs.

Normally when no rod breakage has occured, the standing valves are raised periodically to inspect its seat and its rubber or leather packing cups by screwing or hooking the bottom of the plunger onto the standing valves by means of a standing valve "puller," a complementary threaded or hooking arrangement on the two members.

Since with known fishing tools a broken sucker rod cannot be grasped and at the same time forced downwards and turned, this engagement between plunger and standing valve cannot be accomplished after rod breaking, which thus necessitates an additional "round-trip," involving raising the plunger by the fishing tool, inserting a new rod, lowering the plunger on the rods, engaging the standing valve by the "puller" arrangement, and thus raising the standing valves for inspection.

It is, therefore, an object of the present invention to provide a fishing tool capable of gripping a broken sucker rod below the fracture in such a manner that the puller arrangement in liner-type pumps may be engaged and the additional "round-trip" to retrieve the standing valves can be eliminated.

It is another object of this invention to provide a fishing tool comprising gripping means actuated by downward movement of the tool and so constructed that the object gripped may be rotated and pressed downwards at the same time.

It is a further object to provide such a device which is simple in operation and inexpensive in construction and so designed as to require a minimum of clearance in order to engage the "fish."

The invention consists in the novel parts and combinations of parts, all of which contribute to produce an efficient fishing tool, as will be apparent from the following description taken with reference to the drawing, wherein:

Figure I is a longitudinal section of a preferred embodiment of the present invention as adapted to an "outside" fishing device.

Figure II is a cross-section along the lines II—II of Figure I.

Figure III is a cross-section along the lines III—III of Figure I.

Figure IV is a vertical-sectional view, showing the present fishing tool in engaging position for retrieving both the plunger and standing valves of a liner-type oil well pump.

Figure V is a longitudinal section of an embodiment of the present invention as adapted to an "inside" fishing tool.

Figure VI is a cross-sectional view along the lines VI—VI of Figure V.

Figure VII is a cross-sectional view along the lines VII—VII of Figure V.

Referring to Figures I, II, and III, a preferred form of an "outside" fishing tool of the present invention comprises a body of three cylindrical members 1, 6, and 15 threadably fitted together. The lower body member 1 is provided with a bore 2 having a downwardly converging taper or bowl 3 in the lower portion thereof to receive the slips 4 which are tapered to substantially the same degree. The slips 4 are forced downward by a coil spring 5 which is spaced in the bore 2 between the slips 4 and the center cylindrical body member 6. The slips 4 are formed as of a tubular body which is longitudinally split into preferably three or more sections as shown most clearly in Figure III. These slips 4 are also provided with horizontal teeth 7 on their inner face. These horizontal teeth are directed upwardly so that they may firmly grasp an object when the slips are raised relative to the object to be grasped. A bore 8 through the center body member 6 is of smaller diameter than that of the upper end of the bore 2 in the lower body member 1, and, thus, the body member 6 forms the shoulder for holding the spring 5 in place.

The upper cylindrical body member 15 is machined in such a manner as to have a socket 16 which forms a continuation of the bores 8 and 2 and which is preferably of about the same diameter as the upper portion of the bore 2 in the lower body member 1. However, the bore 16 is provided at its lower end with a downwardly-diverging taper or bowl 17 to receive correspondingly-tapered slips 18. The slips 18 are formed as of a longitudinally split tubular body similar to slips 4, but the inner walls are provided with vertical rack-like teeth 19 which are inclined in the direction in which the object is desired to be turned, as may be seen more clearly in Figure III. The bore through the slips 18 is narrowed by means of inwardly projecting shoulders or stops 27 on the upper portion of said slips. A coil spring 20 is spaced between the upper end of the socket 16 and a washer 21 resting on the upper ends of the slips 18. The slips 18 are prevented from rotating by at least one dowel pin 22 projected through the cylindrical body member 15 at the taper 17 and engaging a keyway 26 in one of the slips 18, as shown, or one of the slots or gaps between the slips. Ports 23 in the upper end of the body member 15 provide fluid communication with the socket 16 in order to relieve any fluid pressure that may develop therein. The upper end of the cylindrical body 15 also is provided with a standard sucker rod pin 24 for attachment to the rod string 25.

In using this device to eliminate a round trip to pick up the standing valves of a liner-type pump after rod breakage, the rod string above the fracture is withdrawn from the well so that the present fishing tool may be attached to the lower end thereof. The double duty fishing tool or socket is then lowered into the well until the top of the rod string 30 below the fracture passes into the axial bores within the fishing device. Referring to Figure IV, the tool is lowered until the upper end of the broken rod 30 contacts the projecting shoulders 27 of the slips 18. On continued lowering of the tool, the pressure of the rod 30 on the shoulders 27 causes the upper slips 18 to move upwardly against the action of the spring 20 and by contact with the taper 17 also inwardly to grip the sucker rod 30 by means of the vertical teeth 19. The broken rod 30 having attached to its lower end a plunger 31 containing traveling valves 32 and 33 and puller nut 34 is rotated and pressed downwards so that the puller nut 34 is screwed onto the puller pin 35 which is carried by the standing valve 36. Normally the standing valve 36 rests in a tapered seat member 37 attached to the lower end of the liner or barrel 38 and is often provided with packing caps 39 to insure a positive seal therebetween. Then on raising the upper portion of the sucker rod, which carries the fishing tool, the lower slips 4 are caused to move slightly downward along the taper 3 and inward, forcing the horizontal teeth 7 against the lower portion 30 of the broken sucker rod string. Thus, the fishing tool is caused to grasp firmly the rod 30, which carries at its lower end the plunger 31 with traveling valves 32 and 33. Since the plunger is also now attached to the standing valve 35—36, the whole assembly can then be raised as a unit to the surface for inspection and/or replacement, whereby the "round-trip" for retrieving the standing valve is eliminated. This has been found in the field to effect a considerable saving in expense and time.

Now referring to Figures V to VII, a fishing tool of the "inside" type embodying the present invention comprises three body members 101, 106, and 115, threadably fastened together. The lower body member 101 is formed with a cylindrical neck 102 in the upper portion and with a downwardly-diverging taper 103 in the lower portion. Slips 104 formed in a manner similar to slips 4 or 18 are tapered to fit about the taper 103, and have horizontal teeth 107, but are also equipped with keyways 50 which fit slidably about keys 51 projecting from the taper 103. The center body member 106 is of greater diameter than the neck 102 of the lower body member 101 and forms a shoulder for holding a coil spring 105 in place about the neck 102. The lower end of the spring 105 acts against the upper ends of the slips 104 and tends to force the slips downwards. A bullet head 52 detachably fastened to the lower end of the body member 101 holds the slips 104 from falling out of their key and keyway engagement with the body member.

The upper body member 115 is provided with a cylindrical neck portion 116, about which is fitted a coil spring 120. The portion above the neck 116 is enlarged to form a shoulder 53 for holding the spring 120 in place, while above the enlarged portion the body member 115 is equipped with a standard sucker rod, or other suitable joint for engagement with means, such as a sucker rod string, for raising and lowering the tool in a well. The lower portion of the upper body member 115 is provided with a downwardly-converging taper 117, from which keys 54 project to engage the keyways 55 in the inner faces of the slips 118 which fit slidably about the tapered portion of the body member 115. The outer faces of the slips 118 are provided with vertical teeth 119 which are inclined in whichever direction it is desired to turn the object to be retrieved from the well. The upper portions of the outer faces of the slips 118 may likewise carry projecting means, removable, if desired, to cause said slips to move upward by contact with the upper end of the fish. A washer 121 riding slidably about the neck 116 above the slips 118 is acted upon by the spring 120, whereby the slips are normally forced downward into retracted position.

The operation of the above-described "inside" type of fishing tool is similar to that of the "outside" type, corresponding parts moving and gripping in like manner. Thus, the upper slips 118 are moved upward and outward relative to the body member 115, and the teeth 119 thereon grip the inside of "lost" tubular objects, when the body member is moved downward therein. The lost object may then be turned in the direction of the inclination of the teeth 119. On raising the device the lower slips 104 are moved relatively downward and outward so that the horizontal teeth 107 bite into the inside of the said tubular object, which may be then raised to the surface by the fishing tool. This embodiment, similarly to the embodiment first described, can be advantageously used in cases where it is desired to impart a rotational motion to the "lost" object.

I am aware that many other devices have already been proposed for fishing in oil wells, such, for example, as the fishing tool described in U. S. Letters Patent No. 1,825,025 issued to Thomas.

These devices, however, are believed to be ineffective for carrying out the particular operations described with regard to the present device.

Although the operation of the present device has been described in particular relation to retrieving broken rods and standing valves, other uses of the double duty fishing tool of the present invention will be apparent to one skilled in the art.

I claim as my invention:

1. In a fishing tool adapted to be lowered into a well for retrieving a lost object therefrom, the combination of a hollowed retaining body having two tapered bowls, the upper of said tapered bowls tapering upwards and the lower tapering downwards, a set of slips carried in each of said bowls, said slips having outer faces slidably fitting in said bowls and inner curved faces forming an axial passage therethrough, the lower set of slips carried by said downwardly-converging tapered bowl having horizontal teeth on its inner face, resilient means for forcing said set of slips downward into engagement with said object, the upper set of slips carried by said downwardly-diverging tapered bowl having vertical teeth on its inner face and stopping means projecting from the upper portion of said inner face, resilient means tending to force said upper set of slips into a retracted position, and means adapted to prevent said upper set of slips from turning about the longitudinal axis, whereby a rotational motion can be imparted to the lost object by applying a downward and a rotational force to the fishing tool, and said object may be withdrawn from the well without disengaging said tool by applying an upward vertical force to the tool.

2. In a fishing tool adapted to be lowered into a well for retrieving a lost object therefrom, the combination of a retaining body member having a hollowed downward opening portion forming two tapered bowls superimposed one above the other, port means in the upper portion of the body member allowing fluid passage therethrough, the upper of said tapered bowls tapering upwards and the lower tapering downwards, a set of slips carried in each of said bowls, said slips having outer faces slidably fitting in said bowls and inner curved faces forming an axial substantially cylindrical passage therethrough, the lower set of slips carried by said downwardly-converging tapered bowl having horizontal teeth on its inner face, resilient means for forcing said set of slips downward into engagement with said object, the upper set of slips carried by said downwardly-diverging tapered bowl having vertical teeth on its inner face and stopping means projecting from the upper portion of said slips into said axial passage, resilient means tending to force said upper set of slips into a retracted position, and means adapted to prevent said upper set of slips from turning about the longitudinal axis whereby a rotational motion can be imparted to the lost object by applying a downward and a rotational force to the fishing tool, and said object may be withdrawn from the well without disengaging said tool by applying an upward vertical force to the tool.

3. In a fishing tool adapted to be lowered into a well for retrieving a lost object therefrom, the combination of a hollowed retaining body having two tapered bowls, the upper of said tapered bowls tapering upwards and the lower tapering downwards, a set of slips carried in each of said bowls, said slips having outer faces slidably fitting in said bowls and inner curved faces forming an axial passage therethrough, the lower set of slips carried by said downwardly-converging tapered bowl having horizontal teeth on its inner face, the upper set of slips carried by said downwardly-diverging tapered bowl having vertical teeth on its inner face and stopping means projecting from the upper portion of said inner face, and means adapted to prevent said upper set of slips from turning about the longitudinal axis, whereby a rotational motion can be imparted to the lost object by applying a downward and a rotational force to the fishing tool, and said object may be withdrawn from the well without disengaging said tool by applying an upward vertical force to the tool.

DOUGLAS WILLIAM WATSON.